(12) United States Patent
Cannon et al.

(10) Patent No.: US 8,332,355 B2
(45) Date of Patent: Dec. 11, 2012

(54) METHOD AND APPARATUS FOR GENERATING READABLE, UNIQUE IDENTIFIERS

(75) Inventors: Lincoln C. Cannon, Provo, UT (US); Paul J. Conover, Provo, UT (US)

(73) Assignee: Symantec Corporation, Mountain View, CA (US)

( * ) Notice: Subject to any disclaimer, the term of this patent is extended or adjusted under 35 U.S.C. 154(b) by 1732 days.

(21) Appl. No.: 11/091,790

(22) Filed: Mar. 28, 2005

(65) Prior Publication Data

US 2006/0218178 A1    Sep. 28, 2006

(51) Int. Cl.
*G06F 17/30* (2006.01)

(52) U.S. Cl. ........................................ 707/626; 707/695

(58) Field of Classification Search .............. 707/3, 205, 707/1, 102, 13, 203, 626, 696, 695; 717/177
See application file for complete search history.

(56) References Cited

U.S. PATENT DOCUMENTS

| | | | | |
|---|---|---|---|---|
| 5,535,375 A | * | 7/1996 | Eshel et al. | 703/27 |
| 6,532,481 B1 | * | 3/2003 | Fassett, Jr. | 707/203 |
| 6,675,382 B1 | * | 1/2004 | Foster | 717/177 |
| 6,804,700 B1 | * | 10/2004 | Terek et al. | 709/203 |
| 6,857,053 B2 | * | 2/2005 | Bolik et al. | 711/162 |
| 6,970,892 B2 | * | 11/2005 | Green et al. | 707/205 |
| 2002/0156767 A1 | * | 10/2002 | Costa et al. | 707/1 |
| 2004/0002991 A1 | * | 1/2004 | Bogdan et al. | 707/102 |
| 2004/0252198 A1 | * | 12/2004 | Hatanaka | 348/207.1 |
| 2005/0010794 A1 | * | 1/2005 | Carpentier et al. | 713/193 |
| 2005/0267982 A1 | * | 12/2005 | Nakatani et al. | 709/233 |
| 2006/0020578 A1 | * | 1/2006 | Hood | 707/3 |
| 2006/0085402 A1 | * | 4/2006 | Brown et al. | 707/3 |

OTHER PUBLICATIONS

ASN.1 markup Language (AML) Nov. 24, 2003, Cover Pages, pp. 1-10.*

* cited by examiner

*Primary Examiner* — Sherief Badawi

(74) *Attorney, Agent, or Firm* — Advantedge Law Group

(57) ABSTRACT

A computer apparatus receives seed characters relating to an object and accesses rules to generate an identifier. The identifier includes a human-readable component that conveys understanding to a non-skilled user. The identifier complies with limitations dictated by the rules and is not based on random generation.

40 Claims, 3 Drawing Sheets

METHOD AND APPARATUS FOR GENERATING READABLE, UNIQUE IDENTIFIERS

TECHNICAL FIELD

The present invention relates generally to the field of object management. More specifically, the present invention relates to techniques for uniquely identifying objects.

BRIEF DESCRIPTION OF THE DRAWINGS

Various embodiments of the invention are now described with reference to the figures, in which.

DETAILED DESCRIPTION

Figure 1:
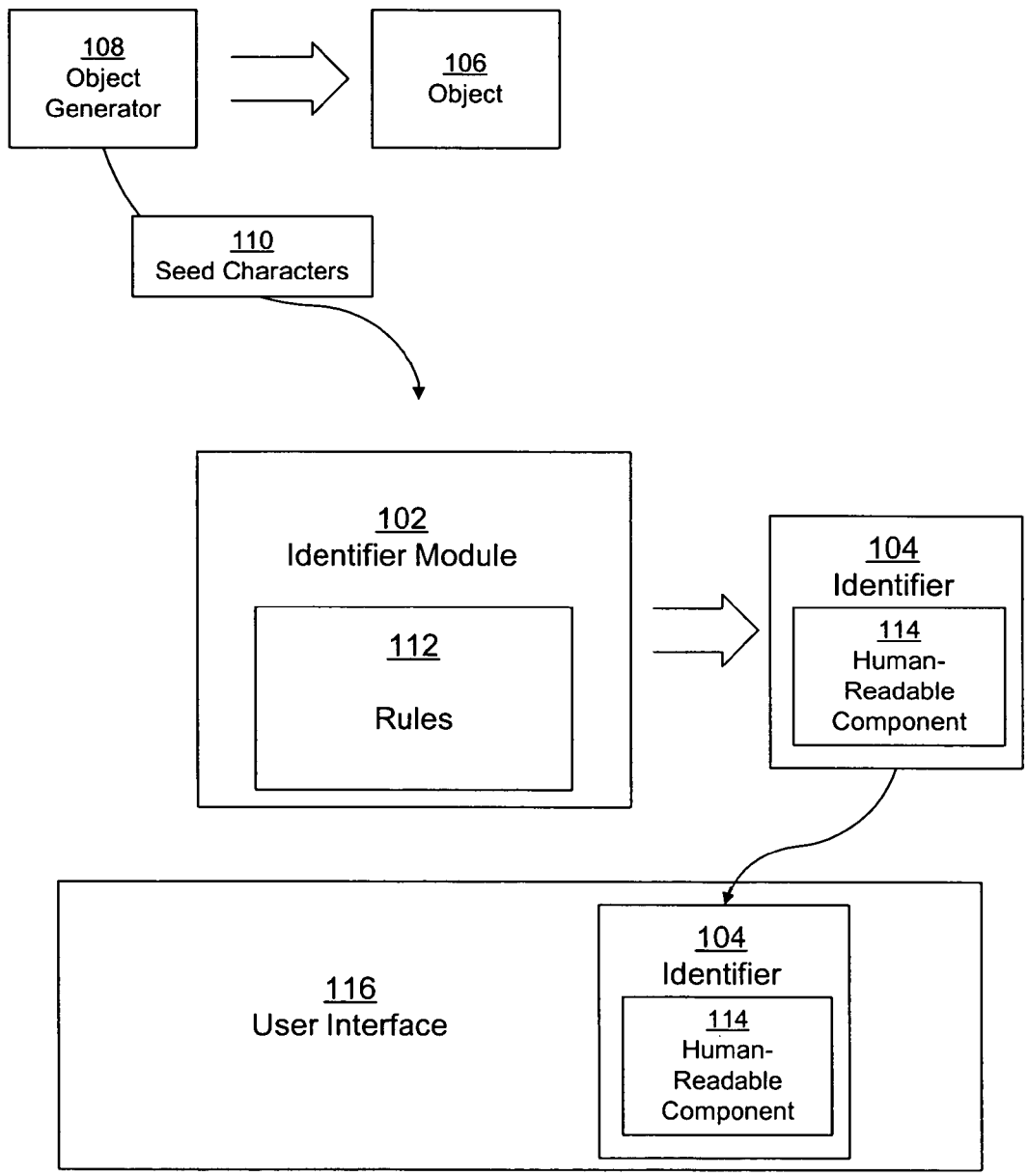
FIG. 1 is a block diagram of a system for generating unique identifications for objects.
Figure 2:
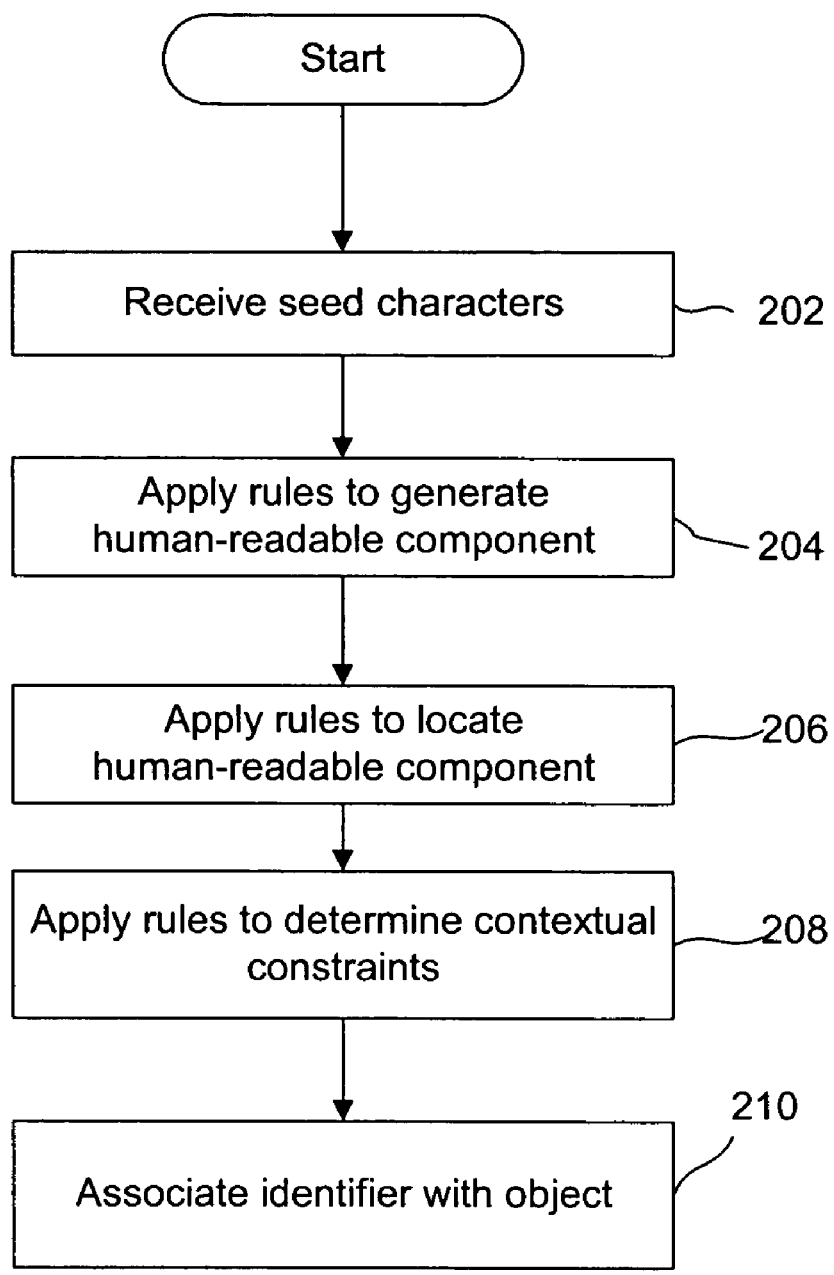
FIG. 2 is a flow diagram of a process for generating unique identifications for objects.
Figure 3:
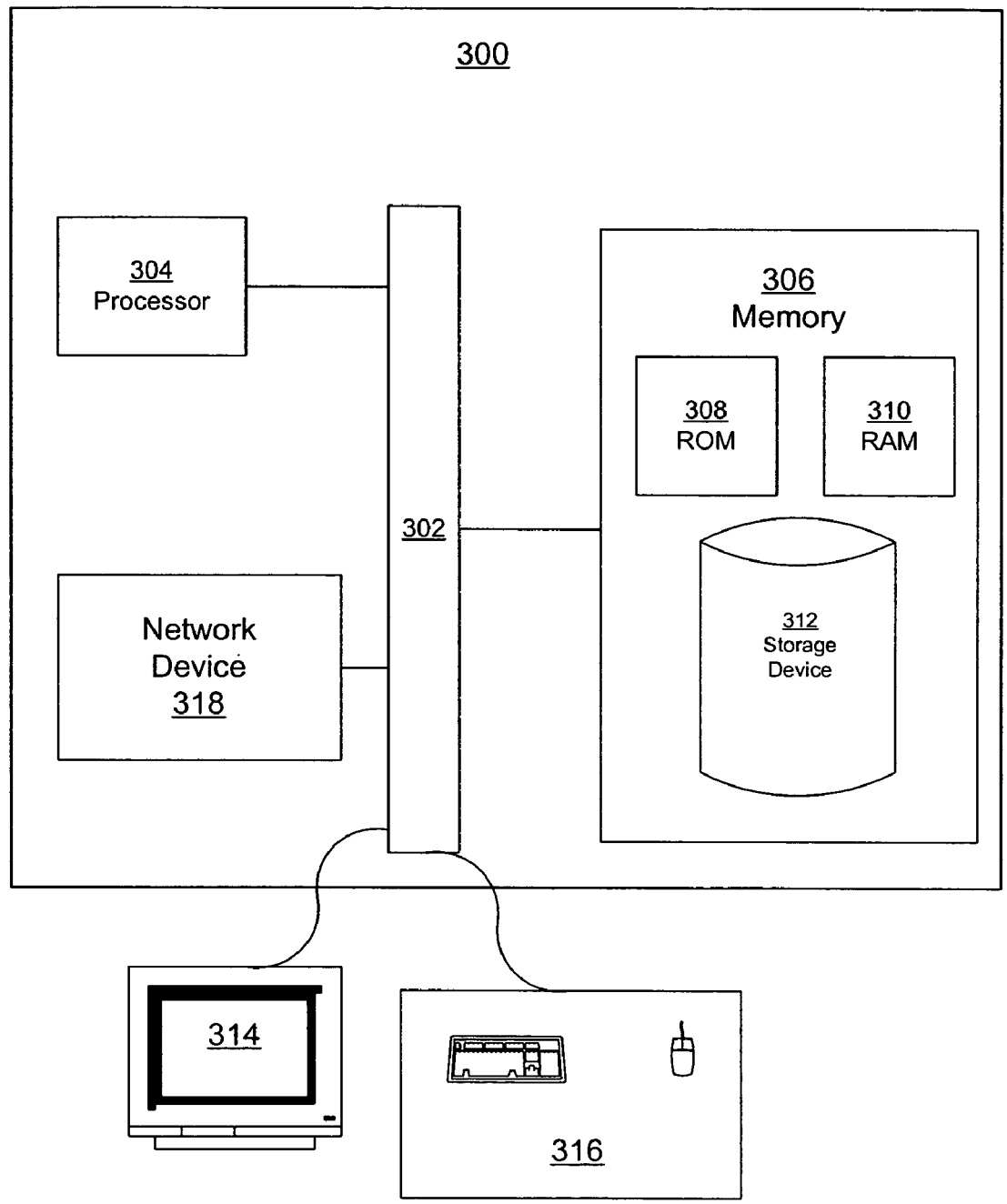
FIG. 3 is a flow diagram of a block diagram of a computer system.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of presently preferred embodiments of the invention.

Parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components. Various operations will be described as multiple discrete steps performed in turn in a manner that is helpful in understanding the present invention. However, the order of description should not be construed as to imply that these operations are necessarily performed in the order they are presented, or even order dependent.

Embodiments of the invention may be represented as a software code resident on a computer readable medium (also referred to as a machine-accessible medium, computer-accessible medium, or a processor-accessible medium). The computer readable medium may be any type of magnetic, optical, or electrical storage medium including a diskette, CD-ROM, memory device (volatile or non-volatile), or similar storage mechanism. The computer readable medium may contain various sets of instructions, code sequences, configuration information, or other data. Those of ordinary skill in the art will appreciate that other instructions and operations necessary to implement the described invention may also be stored on the computer readable medium.

An identifier or name is a sequence of one or more characters that identifies an object, file, data, variable, account, or other entity. For purposes of discussion herein, all named entities are referred to as objects. Generally, any item that can be individually selected and manipulated is an object. This can include shapes and pictures that appear on a display screen as well as less tangible software entities. An object may be a self-contained entity that includes data and may consist of both data procedures to manipulate the data. Software applications incorporate various rules for naming objects. For example, there is often a limit to the number and type of characters that may be used.

Unique identifiers generated by software applications typically have a number of limitations. Identifiers are often unreadable to humans and therefore meaningless. Quite often human readability of identifiers is desired. An identifier may be displayed on a user interface and, although a user can identify the individual characters, no combination of characters conveys a meaning for an associated object. An example, of an unreadable, unique identifier is given as "{22E6D122-8CE1-414b-B201-ED7A5B111CFF}." No part of the identifier conveys a human understanding of a characteristic of the identified object. For an identifier to be human-readable, then some part of the identifier must convey a meaning of a characteristic of the identified object. A human can understand the meaning by visual recognition of a combination of at least some of the characters.

A human-readable identifier may include text from a known language. For example, an identifier "writenow.dat" includes terms from the English language. Based on known definitions and use in the industry, the suffix likely indicates that the identified object is a data file. The prefix may indicate a software application, such as a word processing application that is used by the software application. In generating identifiers, applications frequently produce identifiers with randomly arranged characters. Such identifiers convey no understanding to a user.

The software application, Altiris® Connector, integrates the Altiris® infrastructure with HP® OpenView® Service Desk. As part of this integration, the Connector creates in Service Desk large numbers of items, each of which must have a unique search code that is visible in a user interface. A typical unique identifier satisfies the requirement for uniqueness, but is unreadable and not helpful to the user. A human-readable unique identifier satisfies the uniqueness requirement and provides the user with additional help.

Another limitation of unique identifiers is that they are often generated with randomly assigned characters. However, randomly assigned characters have no relation to the input and are not reproducible. By way of example, each product created by a product delivery team is electronically packaged into a Microsoft® Installer during an automated build process. During packaging, each included file receives a unique file code and each set of files should receive a unique component code that must be maintained from build to build in order to ensure upgradeability between builds of the product. If an automated process randomly generates the unique file codes, then the unique file codes may have no relation to the unique component code and access to previous builds of the product may not be available. Accordingly, randomly generated typical unique identifiers do not work in these conditions. The build process needs the capability of reproducing unique identifiers from explicit input.

An additional limitation of unique identifiers is that they are generated in an inadaptable format. In many cases identifiers must be generated in an adaptable format. For example, each simple network management protocol Trap-Type definition in the Altiris® Custom management information based document must be uniquely identified by an auto-generated string of characters that adheres to the constraints of ASN.1 syntax notation, such as beginning with a lower case letter and containing only letters, numbers and hyphens. A typical unique identifier may not adhere to the constraints of ASN.1 syntax notation and adaptation to contextual constraints is needed.

Referring to FIG. 1, a block diagram is illustrates a conceptual system 100 for generating and reproducing human-readable, unique identifiers from explicitly provided inputs and contextual constraints. The system 100 includes an identifier module 102 that generates human-readable, unique identifiers 104 for objects 106. The system 100 may further include an object generator 108 that may be embodied as a software application to generate an object 106.

Upon generation of an object 106, the object generator 108 transmits seed characters 110 to the identifier module 102. The seed characters 110 relate to the object 106 and may define a characteristic of an object 106. Any data contained within the object 106 may serve as the seed characters 110. For example, the seed characters 110 may include the name of an object, location or path of an object, website URL, and the like. The seed characters 110 may include a one-to-one association with an object name, such as a file name. The seed characters 110 may include some or all of the characters that serve as the code for the object 106.

The identifier module 102 generates a unique identifier 104 based on rules 112. The rules 112 are logic that control and customize the generation of identifiers 104. The rules 112 require that a unique identifier 104 be a string of characters that includes a human-readable component 114. The entire identifier 104 may or may not be human-readable. Thus, the identifier 104 may include a human-readable component 114 and a machine-readable component, or a component whose relevance is not readily understood by a user. The human-readable component 114 readily conveys understanding of a characteristic of the object 106 to one who is not skilled in the art. Thus, a non-programmer may read the human-readable component 114 and understand the significance.

The human-readable component 114 may include a term from a human language. For example, the component 114 may include a term that indicates the application, content, function, and the like. The term "webtools" may be included and signifies an application for generating or editing a website. The term "multiplayer" may signify a game application or game data for multiple users. The human-readable component may include a term that was entered by a user to identify an object, such as a file name. The human-readable component may include a time stamp, such as "JUL-11-2005" to signify an event such as the creation of the object.

The human-readable component 114 may include a known acronym or well-used tokens. For example, a human-readable component 114 may include a website URL (www.johndoe.com) or an email (johndoe@usenet.net). Both websites addresses and email are commonly understood. A human-readable component 114 may include a commonly understood term that signifies the type of file. For example, certain suffixes are well known for unskilled users, such as "exe" for executable, "dat" for data, "txt" for text, "sav" for saved data. The component 114 may also include a commonly understood path to indicate the location of the object. For example, the component 114 may include the characters z:/alpha/beta.dll, which conveys a path and a file name to a user. A user with little computer training understands that a file is stored in an alpha folder on a z drive.

The human-readable component 114 does not include computer readable languages such as binary, hexadecimal, and the like. Although certain skilled programmers are able to understand such languages, unskilled programmers are not and do not fall within the definition of human-readable.

The identifier module 102 extracts characters from the seed characters 110 to generate a human-readable component 114. The rules 112 mandate that there is a human-readable component 114 and may further determine its location within the identifier 104. The rules 112 may require that a prefix or a suffix of an identifier 104 be human-readable. The rules 112 may further require that a human-readable component 114 be emphasized relative to other characters within the identifier 104.

The identifier module 102 further applies rules 112 that define the contextual constraints of the identifier 104. The rules 112 may mandate a minimum and maximum length of characters. The rules 112 may require the use of prefixes and suffixes separated by special characters or tokenized characters. A tokenized character may be a keyword, special symbol, operator, or punctuation mark. The rules 112 determine the included and excluded characters and tokenized characters. The rules 112 may also determine the casing of letter characters. The rules 112 may include additional logic to define the permissible contextual string of characters.

The identifier module 102 and rules 112 do not provide random or psuedo-random character generation. The resulting identifier 104 does not have a randomly generated component. A randomly generated component may include one or more characters. The entire identifier 104 is reproducible in that for the same input the identifier module 102 generates the same identifier. Accordingly, an identifier 102 receiving the same seed characters 110 and applying the same rules 112 will generate the same identifier 104. The identifier 104 is unique in that it will probably not be duplicated for an object 106 with different seed characters 110. Depending on the rules 112 and the seed characters 110, the probability of duplication increases or decreases. The identifier 104 is associated with its specific object 106, may be stored within object 106, and may be inserted into a user interface 116 to identify the object 106.

Referring to FIG. 2 a flow diagram for a process 200 for identifying objects is shown. The identifier module 102 automatically receives 202 seed characters 108 that may be transmitted upon generation of an object 106. Automatically refers to a step or action that is performed without direct human intervention. The identifier module 102 is integrated within a core application or with an object generator 108 to automatically generate a unique identifier 104.

The identifier module 102 parses through the seed characters 108 and applies 204 rules to generate a human-readable component 114. The human-readable component 114 is a legible combination of characters that conveys understanding to an unskilled user. Typically, the human-readable component 114 is a word, partial word, or acronym that is understandable in a human language. The rules 112 may require minimum and maximum character lengths and determine character availability. In one example, the seed characters 108 may include the characters "~operation~." The rules 112 may dictate a maximum of six characters for the human-readable component 114. Furthermore, the "~" character may not be permitted. The resulting human-readable component 114 may include "operat," which is a truncated form of a word but nevertheless conveys understanding. One of skill in the art will appreciate that a vast variety of rules may be applied to seed characters to generate a human-readable component 114 and are included within the scope of the invention.

The identifier module 102 applies 206 rules 112 to locate the human-readable component 114 within the identifier 104. The rules 112 dictate where a human-readable component 114 is placed relative to other characters in the identifier. A human-readable component 114 may be placed at the beginning or end or may be the entire identifier. The rules 112 may determine how a readable component is separated from other characters such as by hyphen, slash, other symbol, or tokenized character. An identifier module 102 may also separate the human-readable component 114. For example, the name of a product file "operat" may be separated from a date stamp, "JUL112005." An identifier 104 may read "operat-JUL112005" which may conveys an understanding of the nature of the object and its date of creation. Locating a human-readable component 114 may further include emphasizing the component in some noticeable manner such as by typeset, capitalization, and the like.

The identifier module 102 applies 208 rules 112 to determine the contextual constraints of the other characters. The rules 112 determine if any additional characters are included. However, the identifier module 102 does not employ random character generation. For a set of rules 112, the identifier module 102 provides expected reproducibility in that the module 102 will generate the equivalent identifier 104 for the same seed characters 110. A non-readable component may include characters with relevance to the object. For example, characters may indicate a serial number for the object generator, a production code, or sequential numbering of a generated object. The non-readable component is added to the human-readable component 114 based on the rules 112. For example, the characters "A456132.756" may be added to "operat-JUL112005" to produce the identifier "operat-JUL112005-A456132.756." The non-readable portion is separated from the readable component. The non-readable portion may have significance and convey serial number, production sequence, or other information, but this is not apparent to an unskilled user.

The generated identifier 104 is associated 210 with the object 106. Association may include inserting the identifier 104 within the object 106 or tying the identifier 104 to the object 106 through a relationship.

Referring to FIG. 3, a typical computer system 300 in which the present invention may operate is shown. One embodiment of the present invention is implemented on a personal computer (PC) architecture. It will be apparent to those of ordinary skill in the art that alternative computer system architectures or other processor, programmable or electronic-based devices may also be employed. A computer system 300 may include a bus 302 for communicating information and a processor 304 coupled with the bus 302 for processing information. The bus architecture employed by computer system 300 may be shared bus architecture.

Processor 304 may be any of a wide variety of general purpose processors, microprocessors, or micro-controllers such as the Pentium® processor manufactured by Intel® Corporation. It will be apparent to those of ordinary skill in the art, however, that other varieties of processors may also be used in a particular computer system.

A memory 306 is coupled with the bus 302 for storing data and executable instructions for the processor 304. The memory 306 may include a read-only memory 308 for storing static information and instructions for the processor 304. The memory 306 may include a random access memory 310 for short-term storage. The memory 306 may further include a storage device 312 for non-volatile long-term memory storage. The storage device 312 may include a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium.

A display device 314 is coupled with the bus 302 for displaying information for a user. The display device 314 may be a liquid crystal device, cathode ray tube (CRT), or other suitable display device 314. The computer system 300 includes an input device 316 coupled with the bus 302 for communicating information and command selections to the processor 304. The input device 316 may include a keyboard and a pointing device such as a conventional mouse or trackball device.

The computer system 300 may include a network device 318 for connecting to a network such as a LAN, WAN, and the Internet. The network device 318 may include Ethernet devices, phone jacks and satellite links. It will be apparent to one of ordinary skill in the art that other network devices may also be utilized.

In operation, the processor 304 retrieves processing instructions and data from the identifier module 102 that is resident, in whole or in part, within memory 310. The processor 304 executes the instructions that may be received as an instruction stream. Command selections and information input at input device 316 may be used to direct the flow of instructions executed by processor 304. The results of processed execution may be displayed on the display device 314.

The disclosed method and apparatus produce and reproduce human-readable, unique identifiers from explicitly provided inputs and contextual constraints. Given the string of characters and contextual constraints, the identifier module produces a unique identifier that is human-readable and reproducible. The identifier module may be considered a core technology to enable automated production of packages. The present invention solves problems regularly encountered when attempting to identify programmatic items in highly automated and scalable systems. The method and apparatus disclosed herein are able to produce unique identifiers that comply with the constraints enforced by industry standards. This allows for interoperability in a greater scale and in a more highly automated manner.

Embodiments of the present invention include various steps which have been described above. The steps may be embodied in machine-executable instructions which may be used to cause a general purpose or special purpose processor to perform the steps. Alternatively, these steps may be performed by specific hardware components that contain hard-wired logic for performing the steps, or by any combination of programmed computer components and custom hardware components.

Elements of the present invention may also be provided as a computer program product that may include a computer readable medium having stored thereon instructions that may be used to program a computer, or other electronic device, to perform a process. The computer readable may include, but is not limited to, optical disks, CD-ROMs, DVD, floppy diskettes, magneto-optical disks, ROMs, RAMs, EPROMs, EEPROMs, magnet or optical cards, propagation media or other type of media/machine readable mediums suitable for storing electronic instructions. For example, the present invention may be downloaded as a computer program product, wherein the program may be transferred from a remote computer to a requesting or client computer by way of data signals embodied in a carrier wave or other propagation medium via a communication link.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

What is claimed is:

1. A method for generating a first identifier having a plurality of characters and identifying an object, the method comprising:
    receiving first seed characters from an object generator, the first seed characters relating to an object;
    processing the first seed characters to generate a human-readable component and a non-readable component based on rules;
    applying the rules to determine a syntax of the first identifier;
    applying the rules to determine placement of the human-readable component relative to the non-readable component; and
    inserting the human-readable and non-readable components within the first identifier to thereby provide an identifier unique to the object, wherein processing the seed characters, applying the rules, and inserting the human-readable and non-readable components are performed by an identifier module, the identifier module being programmed to reproduce an additional identifier that is identical to the first identifier each time the identifier module uses the rules on additional seed characters that are identical to the first seed characters.

2. The method of claim 1, wherein applying the rules to determine the syntax includes at least one of:
    determining minimum and maximum length limitations;
    determining if each character in the first identifier is acceptable;
    determining the casing of each letter character.

3. The method of claim 2, further comprising at least one of:
    truncating the human-readable component based on the maximum length limitation;
    lengthening the human-readable component based on the minimum length limitation.

4. The method of claim 1, further comprising emphasizing the human-readable component.

5. The method of claim 4, wherein emphasizing the human-readable component comprises at least one of:
    typesetting the human-readable component different than the non-readable component;
    capitalizing at least a portion of the human-readable component.

6. The method of claim 1, wherein the non-readable component comprises at least one character associated with the object.

7. The method of claim 6, wherein the non-readable component comprises at least one of:
    a serial number of the object;
    a production sequence of the object.

8. The method of claim 1, wherein the human-readable component includes at least one of:
    an acronym;
    a time stamp;
    a word from a human language.

9. The method of claim 1, wherein the human-readable component serves as a prefix in the first identifier.

10. The method of claim 1, wherein the human-readable component serves as suffix in the first identifier.

11. The method of claim 1, wherein the human-readable component is the first identifier.

12. The method of claim 1, wherein the human-readable component includes a file path.

13. The method of claim 1, wherein the method further comprises storing the first identifier within the object.

14. A computer-readable storage medium having stored thereon computer instruction code for performing a method for generating a first identifier having a plurality of characters and identifying an object, the computer-readable storage medium comprising:
    receiving first seed characters from an object generator, the first seed characters relating to an object;
    processing the first seed characters to generate a human-readable component and a non-readable component based on rules;
    applying the rules to determine a syntax of the first identifier;
    applying the rules to determine placement of the human-readable component relative to the non-readable component; and
    inserting the human-readable and non-readable components within the first identifier to thereby provide an identifier unique to the object, wherein processing the seed characters, applying the rules, and inserting the human-readable and non-readable components are performed by an identifier module, the identifier module being programmed to reproduce an additional identifier that is identical to the first identifier each time the identifier module uses the rules on additional seed characters that are identical to the first seed characters.

15. The computer-readable storage medium of claim 14, wherein applying the rules to determine the syntax includes at least one of
    determining minimum and maximum length limitations
    determining if each character in the first identifier is acceptable;
    determining the casing of each letter character.

16. The computer-readable storage medium of claim 15, further comprising at least one of:
    truncating the human-readable component based on the maximum length limitation;
    lengthening the human-readable component based on the minimum length limitation.

17. The computer-readable storage medium of claim 14, further comprising emphasizing the human-readable component.

18. The computer-readable storage medium of claim 17, wherein emphasizing the human-readable component comprises at least one of:
    typesetting the human-readable component different than the non-readable component;
    capitalizing at least a portion of the human-readable component.

19. The computer-readable storage medium of claim 14, wherein the non-readable component comprises at least one character associated with the object.

20. The computer-readable storage medium of claim 19, wherein the non-readable component comprises at least one of:
    a serial number of the object;
    a production sequence of the object.

21. The computer-readable storage medium of claim 14, wherein the human-readable component includes at least one of:
    an acronym;
    a time stamp;
    a word from a human language.

22. The computer-readable storage medium of claim 14, wherein the human-readable component serves as a prefix in the first identifier.

23. The computer-readable storage medium of claim 14, wherein the human-readable component serves as suffix in the first identifier.

24. The computer-readable storage medium of claim 14, wherein the human-readable component is the first identifier.

25. The computer-readable storage medium of claim 14, wherein the human-readable component includes a file path.

26. The computer-readable storage medium of claim 14, wherein the method further comprises storing the first identifier within the object.

27. A computer apparatus to generate a first identifier having a plurality of characters and identifying an object, comprising:
   a processor; and
   a memory in electrical communication with the processor and having stored thereon computer readable instruction code, including:
      an identifier module to perform the method of:
         receiving first seed characters from an object generator, the first seed characters relating to an object;
         processing the first seed characters to generate a human-readable component and a non-readable component based on rules;
         applying the rules to determine a syntax of the first identifier;
         applying the rules to determine placement of the human-readable component relative to the non-readable component and
         inserting the human-readable and non-readable components within the first identifier to thereby provide an identifier unique to the object, wherein processing the seed characters, applying the rules, and inserting the human-readable and non-readable components are performed by an identifier module, the identifier module being programmed to reproduce an additional identifier that is identical to the first identifier each time the identifier module uses the rules on additional seed characters that are identical to the first seed characters.

28. The computer apparatus of claim 27, wherein applying the rules to determine the syntax includes at least one of:
   determining minimum and maximum length limitations;
   determining if each character in the first identifier is acceptable;
   determining the casing of each letter character.

29. The computer apparatus of claim 28, further comprising at least one of:
   truncating the human-readable component based on the maximum length limitation;
   lengthening the human-readable component based on the minimum length limitation.

30. The computer apparatus of claim 27, further comprising emphasizing the human-readable component.

31. The computer apparatus of claim 30, wherein emphasizing the human-readable component comprises at least one of
   typesetting the human-readable component different than the non-readable component;
   capitalizing at least a portion of the human-readable component.

32. The computer apparatus of claim 27, wherein the non-readable component comprises at least one character associated with the object.

33. The computer apparatus of claim 32, wherein the non-readable component comprises at least one of:
   a serial number of the object;
   a production sequence of the object.

34. The computer apparatus of claim 27, wherein the human-readable component includes at least one of:
   an acronym;
   a time stamp;
   a word from a human language.

35. The computer apparatus of claim 27, wherein the human-readable component serves as a prefix in the first identifier.

36. The computer apparatus of claim 27, wherein the human-readable component serves as suffix in the first identifier.

37. The computer apparatus of claim 27, wherein the human-readable component is the first identifier.

38. The computer apparatus of claim 27, wherein the human-readable component includes a file path.

39. The computer apparatus of claim 27, wherein the method further comprises storing the first identifier within the object.

40. A method for generating an identifier, the method comprising:
   receiving seed characters associated with a first object to be included in a first build of an installation package;
   processing the seed characters to generate a human-readable component;
   applying rules to determine a syntax of the identifier;
   inserting the human-readable component within the first identifier, wherein processing the seed characters, applying the rules, and inserting the human-readable component are performed by an identifier module, the identifier module being configured to generate, during a second build of the installation package, a second identifier for the first object, the second identifier being identical to the first identifier.

* * * * *